(12) United States Patent
Johnson et al.

(10) Patent No.: US 7,722,931 B2
(45) Date of Patent: *May 25, 2010

(54) METHOD OF FORMING MULTI-LAYER COATING FILMS ON AUTOMOBILE BODIES WITHOUT A PRIMER BAKE

(75) Inventors: Jeffery W. Johnson, Rochester, MI (US); San C. Yuan, Commerce Township, MI (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 902 days.

This patent is subject to a terminal disclaimer.

(21) Appl. No.: 11/543,362

(22) Filed: Oct. 5, 2006

(65) Prior Publication Data

US 2007/0110902 A1 May 17, 2007

Related U.S. Application Data

(60) Provisional application No. 60/725,014, filed on Oct. 7, 2005.

(51) Int. Cl.
*B05D 3/02* (2006.01)
(52) U.S. Cl. .................. 427/385.5; 427/372.2; 427/402
(58) Field of Classification Search .............. 427/372.2, 427/375, 384, 385.5, 402; 428/500; 524/504
See application file for complete search history.

(56) References Cited

U.S. PATENT DOCUMENTS 4,591,533 A    5/1986  Antonelli et al.

(Continued)

FOREIGN PATENT DOCUMENTS

DE    199 48 004 A1    7/2001
DE    103 11 476 A1    9/2004
EP    1 201 690 A2    5/2002
WO    WO 87/03605    6/1987

OTHER PUBLICATIONS

PCT International Search Report and Written Opinion for International Application No. PCT/US2006/039658 dated Jun. 22, 2007.

*Primary Examiner*—Thao T. Tran
(74) *Attorney, Agent, or Firm*—Gann G. Xu

(57) ABSTRACT

This invention relates to a method for forming a multi-layer coating, comprising sequentially applying a primer surfacer, a basecoat, and a clear coat composition on an automotive substrate in a wet-on-wet-on-wet manner, and simultaneously curing the applied three layers together in a single baking step, wherein the primer surfacer comprises: a film forming binder, a volatile organic liquid carrier, and pigment (s); and the binder contains about:
  (a) about 30 to 80% by weight, based on the weight of the binder, of a hydroxyl functional polyester resin;
  (b) about 10 to 30% by weight, based on the weight of the binder, of a crosslinking agent selected from the group consisting of a melamine resin, a blocked polyisocyanate resin, or a mixture thereof;
  (c) about 10 to 40% by weight, based on the weight of the binder, of a dispersed graft polymer comprising a non-crosslinked core of acrylic polymer which is substantially non-soluble in non-polar organic solvent and, grafted to the core, one end of an acrylic stabilizer in the form of a macromonomer, said acrylic stabilizer being soluble in a non-polar organic solvent;
wherein the composition is, preferably, essentially free of crosslinked nonaqueous dispersion resin particles or crosslinked microgel resin particles or both, and the composition also contains at least one non-polar organic solvent at the time of application.

The resulting multi-layered coating film has excellent aesthetic appearance, chipping resistance, sag resistance, and film build even when formed in a three wet layered application method.

5 Claims, 1 Drawing Sheet

U.S. PATENT DOCUMENTS

| | | |
|---|---|---|
| 4,680,352 A | 7/1987 | Janowicz et al. |
| 4,722,984 A | 2/1988 | Janowicz |
| 5,162,426 A | 11/1992 | Hazan et al. |
| 5,314,945 A * | 5/1994 | Nickle et al. ............... 524/507 |
| 6,863,929 B2 | 3/2005 | Watanabe et al. |
| 2005/0161330 A1 | 7/2005 | Toi et al. |

* cited by examiner

METHOD OF FORMING MULTI-LAYER COATING FILMS ON AUTOMOBILE BODIES WITHOUT A PRIMER BAKE

CROSS-REFERENCE TO RELATED APPLICATION

This application claims priority under 35 U.S.C. §119 from U.S. Provisional Application Ser. No. 60/725,014, filed Oct. 7, 2005.

FIELD OF THE INVENTION

The invention concerns a method of forming multi-layer coating films on an automotive body or part thereof and in particular to a method of forming multi-layer coating films with which a good finished appearance can be obtained by baking the primer, basecoat, and clearcoat layers at the same time, and also to a primer composition which has excellent resistance to interfacial bleeding with the top coated film and can be used in the forgoing method.

BACKGROUND OF THE INVENTION

Coating systems for automobiles normally comprise a multiplicity of coatings applied to a steel substrate. Typically, the steel is treated with a rust-proofing phosphate layer, then a cathodic electrocoat primer for additional corrosion protection is applied. A primer-surfacer (also known as a chip resistant primer, primer, or primer filler) is used next to smooth the surface for topcoating and also to provide stone chip resistance to the coating system during the normal course of driving. Then a top-coat system is applied, sometimes as a single colored coat, more often now as a basecoat with solid color or flake pigments followed by a transparent protective clear coat, to protect and preserve the attractive aesthetic qualities of the finish on the vehicle even on prolonged exposure to the environment or weathering.

Coating film formation of the basecoat and the clearcoat is normally achieved by wet-on-wet application, which is to say that the clearcoat is applied to the basecoat without baking the basecoat prior to clearcoat application (although the basecoat may be flash dried for a short period of time at room temperature prior to clearcoat application), and then subsequently baking the basecoat and clearcoat at the same time to form a dried and cured finish. In the conventional method for forming the multi-layer coating film, the underlying primer surfacer layer, however, is baked before being topcoated with basecoat and clearcoat. Historically, baked primers have been used not only to provide a smooth surface on which to apply the topcoat, but also to also prevent interfacial bleeding or intermixing with the overlying basecoat and avoid disrupting the appearance of the overall topcoat finish. Resistance to intermixing (sometimes referred to as "strike-in" resistance) is especially important for the appearance of glamour metallic finishes which are popular nowadays on automobiles and trucks. Any disturbance of the metallic pigment flake orientation in metallic basecoats after application over the primer-surfacer will detract from the metallic effect of the finish. Therefore, care must be taken to ensure that the metal pigment flakes are not disturbed after painting.

In recent years, it has also been strongly desired to reduce the environmental load or impact of automotive assembly plants by reducing VOC (volatile organic compounds) emissions and $CO_2$ (carbon dioxide) emissions generated from operating painting booths and baking ovens. This has led to use of lower solvent content in the paint and the development of three-layer wet paint systems which make it possible to apply a primer surfacer, basecoat and clearcoat wet-on-wet continuously before they are cured all at once in a single bake. With this simplified application process, it is possible to eliminate the separate primer painting booth and primer oven, which also results in substantial cost savings to the automobile manufacturers. The technical hurdles of this process simplification, however, have been significant. For instance, interfacial bleeding and aesthetic appearance, as well as film properties such as chip resistance are still significant concerns.

Attempts have been made to address the forgoing problems by modifying the formulation of the primer coating material. U.S. Pat. No. 6,863,929 of Watanabe et al. describes a method for forming a multilayer automotive coating film using a three layer wet paint process (also referred to as a "3 wet" or a "3-coat-1-bake" process) wherein a standard polyester-melamine primer coating is formulated to also contain acrylic polymer particles, namely in the form of internally crosslinked nonaqueous dispersion (NAD) polymers or internally crosslinked microgel particles. These particles are intended to raise the viscosity and solubility parameter between the primer surfacer and the base coating to prevent intermixing at the interface between the coated layers. However, use of such crosslinked particle-filled systems also suffers from some drawbacks.

For example, the microparticles also tend to create voids in the surface of the wet primer where the basecoat can still flow in and intermix, resulting in defects in the aesthetic appearance such as loss of smoothness, gloss, head on brightness, and/or metallic effect. Sagging of these coatings, especially on vertical panels, such as doors, fenders, rocker panels, etc, is also a problem. These particle-filled systems are also not able to maintain dry film builds at normal commercial levels. Film builds must therefore be reduced to allow the NAD or microgel particle to migrate to the interface. Yet, thin films are an impediment as they tend to subject the underlying corrosion-protective electrocoated primer layer to excessive UV light transmission and deterioration. Thin films or thin film regions are also inadequate for mechanical properties and visual appearance of the overall finish.

Therefore, there is still a need to find a more effective way to prevent the inter-mixing of the primer surfacer and basecoat and clearcoat layers when applied in a wet on wet (i.e., a 3 wet) manner and make it possible to eliminate the primer baking process and reduce the environmental impact of the coating system, while also maintaining film builds, the overall appearance such as high gloss and distinctness of image and film properties of the coating system.

The present invention has the aforementioned desirable characteristics.

SUMMARY OF THE INVENTION

The present invention now provides a method and a primer coating composition for forming a multi-layered coating film, which is capable of controlling intermixing of adjacent paint layers, and interfacial bleeding, and inversion at the interface between each coated layer when a primer coating, a base coating, and a clear coating are applied sequentially over each other in a wet-on-wet (i.e., wet-on-wet-on-wet) manner on a substrate before being baked together, while still meeting today's performance requirements such as good appearance, chip performance, and film builds.

More particularly, the present invention provides a method for forming a multi-layer coating film of automotive quality and appearance on a substrate without the need for a primer bake and the need to reduce film builds below normal commercial levels, comprising the steps of sequentially applying a primer coating composition, a basecoating composition, and a clear coating composition in a wet-on-wet manner on an automotive substrate, such as over the entire vehicle body or part thereof, preferably on which an electrodeposition coated film has been formed, and simultaneously curing the applied three layers by baking, wherein the primer coating composition comprises: a film-forming binder and an organic liquid carrier, and optionally, but preferably pigment(s); and the binder contains:

(a) about 30 to 80% by weight, based on the weight of the binder, of a hydroxyl functional polyester resin (b) about 10 to 30% by weight, based on the weight of the binder, of a crosslinking agent selected from the group consisting of a melamine resin, a blocked polyisocyanate resin, or a mixture melamine and blocked isocyanate (c) about 10 to 40% by weight, based on the weight of the binder, of a dispersed graft copolymer referred to as a solvent responsive dispersion (SRD) comprising a non-crosslinked backbone (or core) of acrylic polymer which is substantially non-soluble in non-polar organic solvent and, grafted to the core, a plurality of substantially linear acrylic stabilizer components, each of which is soluble in the non-polar organic solvent and has one end of the stabilizer molecule grafted to the core, and having a weight average molecular weight of about 10,000 to 100,000; and wherein the composition is, preferably, essentially free to totally free of crosslinked NADs or microgel resin particles or both.

The composition is also preferably formulated as a low VOC, high solids composition having a total solids content of about 40-70% by weight at the time of application.

The invention is based on the discovery that use of certain relatively high molecular weight SRD branched acrylic polymers in the primer composition enables the composition to effectively prevent intermixing of the primer and basecoating layers when the basecoat which follows is applied over the primer in a wet on wet manner, while still providing an aesthetic appearance and film properties such as chip resistance and solids content and film builds equal to that of conventional baked primers.

The invention also provides a high solids solvent borne primer coating composition comprising the aforesaid ingredients (a) to (c), for use in the aforesaid method for forming a multi-layer coating film. The behavior of the primer defined above allows for high film builds, excellent appearance such as high gloss, distinctness of image, and desired visual (such as metallic or pearlescent) effect, and excellent chip resistance (a minimum rating of 5 using SAE J-400), despite the absence of a primer bake.

Also included within the scope of this invention is a substrate, such as a vehicle body or part thereof, coated by the method and with the coating composition disclosed herein.

The invention is especially useful for finishing the entire exterior body of automobiles and trucks and parts thereof.

DETAILED DESCRIPTION OF THE INVENTION

Figure 1:
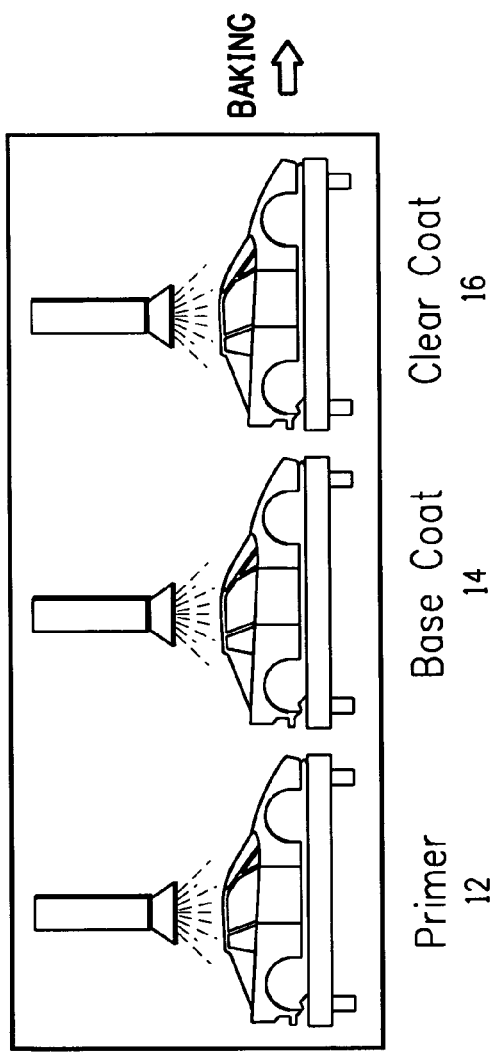
FIG. 1 is a schematic diagram of a three-layer wet paint application process in accordance with the present invention.

In this disclosure, a number of terms and abbreviations are used. The following definitions are provided.

"Wet-on-wet" means that an overlying coat is applied to an underlying coat without curing (i.e., baking) or completely drying the underlying coat.

"Wet-on-wet on-wet", which is used interchangeably herein with "three layer wet", "3 wet", and "3-coat-1-bake", means that the primer layer, basecoat layer, and clearcoat layer are applied successively in a wet-on-wet manner.

"Essentially free" with respect to the primer coating shall mean that the primer coating composition contains less than 1% by weight, preferably zero percent by weight, of the specified component, based on the total weight of the composition.

"High solids composition" means a low solvent coating composition having a total solids content of above 40 percent, preferably in the range of from 40-70 percent, in weight percentages based on the total weight of the composition. It should be understood that "total solids" refers to the total amount of non-volatile components in the composition even though some of the components may be non-volatile liquids rather than solids at room temperature.

"SRD" means a solvent responsive dispersion, which is understood as a dispersed polymer which is dispersed in at least one non-solvent for the polymer. The SRD polymer is distinguished from a microgel and a non-aqueous dispersion in that and SRD has no internal crosslinking.

Primer Coated Layer

In the present method for forming a multi-layer coating film, a novel primer surfacer coating composition having the ability to prevent inter-mixing of the top coated layer when applied wet-on-wet thereover is employed. This primer surfacer, primer filler, or chip resistant primer, hereinafter "primer", can be used in the three layer wet paint method described herein without sacrificing good finished appearance and good chip performance and good film builds.

The solvent borne primer composition is not only useful in a wet-on-wet application process, it can be formulated to have a low VOC content (volatile organic content), can be formulated into a gray or colored composition that is easy to hide, forms finishes that are hard but still flexible, has excellent adhesion to a variety of substrates such as cold rolled steel, phosphatized steel, phosphatized steel primed with an electrocoat primer applied by electrocoating, plastic substrates which may be preprimed or unprimed such as polyester reinforced fiber glass, reaction injection molded urethanes, partially crystalline polyamides and other plastic substrates and provides a surface to which conventional topcoats will adhere.

The primer composition is particularly useful on the aforementioned substrates since it can be used as a surfacer or filler to cover imperfections in surfaces of primed metal and plastic substrates. For example, electrocoating of metal substrates with a primer often results in a finish that has small imperfections and this composition can be applied to form a smooth, glossy finish that is free from imperfections. Also, plastic substrates such as SMC (sheet molding compound) which is a polyester reinforced with fiber glass contains many surface imperfections and must be coated with a surfacer.

The novel primer composition of this invention generally contains a film forming binder and a volatile organic liquid carrier, which usually is a solvent for the binder. It is generally desired that the composition be formulated as a low VOC composition. Accordingly, for low VOC compositions, the primer composition typically has a film forming binder content of about 40-85% by weight and correspondingly about 15-60% by weight of volatile organic liquid carrier. Generally, the composition also contains pigments in a pigment to binder weight ratio of about 1:100-150:100.

As indicated above, the film-forming portion of the primer composition of this invention is referred to as the "binder" or "binder solids". The binder generally includes all the film-forming components that contribute to the solid organic portion of the cured composition. Generally, catalysts, pigments, and non-polymeric chemical additives such as stabilizers described hereinafter are not considered part of the binder solids. Non-binder solids other than pigments usually do not amount to more than about 5-15% by weight of the composition. In this disclosure, the term "binder" or "binder solids" refers to the film-forming hydroxyl functional polyester resin, the melamine or polyisocyanate crosslinking agent, the acrylic SRD polymer, and all other optional film-forming components, as are further described hereinbelow.

In a preferred embodiment, the binder or film forming constituent used in the composition generally comprises about 30-80% by weight of the aforesaid hydroxyl functional polyester resin, about 10-30% by weight of an aminoplast resin and/or blocked polyisocyanate cross-linking agent; and about 10-40% by weight of the aforesaid acrylic SRD polymer. It should be understood that a blocked polyisocyanate crosslinking agent can be used to replace some portion or all of the aminoplast, if desired. Blocked polyisocyanates are however known to increase the overall cost of the composition and therefore are less desirable. For most uses, the composition typically contains about 30-50% by weight of polyester resin; 15-25% by weight of melamine resin; and 20-30% by weight of SRD polymer. Of course, the total amount of components employed in the binder will equal 100% and therefore if an amount equal to or approaching the either the minimum or maximum of one particular component is employed, then the relative amounts of the remaining components must be adjusted accordingly.

The polyester resin typically used herein has a Mw (weight average molecular weight) of preferably about 1,200 to 2,400, more preferably from about 1,500 to 2,100, a hydroxyl value of preferably about 50 to 200, more preferably about 75-175, and an acid value of preferably 0 to 25 mg KOH/g, more preferably 0 to 15, in order to obtain the desired film properties and water resistance of the coated film.

All molecular weights described herein are determined by gel permeation chromatography using polystyrene as the standard.

In general, a polyester resin can be produced by conducting the polycondensation reaction between an acid ingredient such as polyvalent carboxylic acid and/or acid anhydride with polyhydric alcohol.

Examples of the polyvalent carboxylic acid and/or acid anhydride include, but are not limited to, isophthalic acid, isophthalic anhydride, phthalic acid, phthalic anhydride, tetrahydrophthalic acid, tetrahydrophthalic anhydride, hexahydrophthalic acid, hexahydrophthalic anhydride, methyltetrahydrophthalic acid, methyltetrahydrophthalic anhydride, hymic anhydride, trimellitic acid, trimellitic anhydride, pyromellitic acid, pyromellitic anhydride, terephthalic acid, maleic acid, maleic anhydride, fumaric acid, itaconic acid, adipic acid, azelaic acid, sebacic acid, succinic acid, succinic anhydride, dodecenyl succinic acid and dodecenyl succinic anhydride.

Examples of the polyhydric alcohol include, but are not limited to, ethylene glycol, diethylene glycol, polyethylene glycol, propylene glycol, dipropylene glycol, polypropylene glycol, neopentyl glycol, 1,2-butane diol, 1,3-butane diol, 1,4-butane diol, 2,3-butane diol, 1,5-pentane diol, 1,6-hexane diol, 1,4-cyclohexane diol, 2,2-dimethyl-3-hydroxypropyl-2,2-dimethyl-3-hydroxypropionate, 2,2,4-trimethyl-1,3-pentane diol, polytetramethylene ether glycol, polycaprolactone polyol, glycerin, sorbitol, annitol, trimethylolethane, trimethylolpropane, trimethylolbutane, hexane triol, pentaerythritol and dipentaerythritol.

In addition to the aforementioned polyvalent carboxylic acids and/or acid anhydrides and polyhydric alcohols, monocarboxylic acids, hydroxycarboxylic acids, lactones and the like may be employed for the polycondensation reaction. Drying oils, semidrying oils and their fatty acids may also be employed. Concrete examples of which include monoepoxide compounds such as Cardura E® (manufactured by Shell Chemical Co.) and lactones. The lactones mentioned above are capable of undergoing ring-opening addition with polyesters of polycarboxylic acids and polyhydric alcohols to form a graft chain and include but are not limited to beta-propiolactone, dimethylpropiolactone, butyrolactone, gamma-valerolactone, epsilon-caprolactone, gamma-caprolactone, gamma-caprylactone, crotolactone, delta-valerolactone and delta-caprolactone. The most preferred of these is epsilon-caprolactone.

One preferred polyester polymer contains about 30-40% by weight of neopentyl glycol, 7-12% by weight of trimethylolpropane, 8-20% by weight of adipic acid, 10-25% by weight of isophthalic acid, and 20-30% by weight of phthalic anhydride and a hydroxyl value of 115-160 and an acid value of 0-5.

In addition to the polyester resin component, the primer composition also contains, as part of the film-forming binder, a crosslinking agent. The crosslinking agent used in the composition is an aminoplast resin or blocked polyisocyanate resin or mixture of the two. Aminoplasts resins such as melamine formaldehyde condensates are generally preferred. In general, aminoplast resins are aldehyde condensation products of melamine, urea, benzoguanamine, or a similar compound. Usually, the aldehyde employed is formaldehyde, although useful products can be made from other aldehydes, such as acetaldehyde, crotonaldehyde, acrolein, benzaldehyde, furfural; and others. Condensation products of melamine or urea are the most common and are preferred, but products of other amines and amides in which at least one amine group is present can also be employed.

Of the melamine condensates, monomeric or polymeric melamine formaldehyde condensate resins that are partially or fully alkylated are generally preferred. These preferred resins are organic solvent-soluble and are commercially available under the tradename Cymel® from Cytec Industries, Inc., West Patterson, N.J. One preferred crosslinking agent is a methylated and butylated or isobutylated melamine formaldehyde resin that has a degree of polymerization of about 1-3. Generally, this melamine formaldehyde resin contains about 50% butylated groups or isobutylated groups and 50% methylated groups. Another preferred melamine, for a good balance of properties is, a fully butylated resin known as Cymel 1156®.

Other possible crosslinking agents, of course, can also be used, such as urea formaldehyde, benzoquanamine formaldehyde and blocked or unblocked polyisocyanates or compatible mixtures of any of the forgoing crosslinkers.

For instance, the aminoplast crosslinking agent(s) described above can be substituted for or optionally combined with any of the conventional blocked polyisocyanate crosslinking agents for enhanced film properties. Typical blocking agents are alcohols, ketimines, oximes, pyrazoles and the like.

Typical examples of polyisocyanates are isocyanate compounds having 2 to 4 isocyanate groups per molecule, such as 1,6-hexamethylene diisocyanate, isophorone diisocyanate, 2,4-toluene diisocyanate, diphenylmethane-4,4'-diisocyanate, dicyclohexylmethane-4,4'-diisocyanate, tetramethylxylidene diisocyanate, and the like. Polyisocyanates having isocyanurate structural units can also be used such as the isocyanurate of hexamethylene diisocyanate which is available under the tradename Desmodur® N-3390 from Bayer Corporation of Pittsburgh, Pa., the isocynaurate of isophorone diisocyanate (isocyanurate) which is available under the tradename Desmodur® Z-4470 from Bayer Corporation and the like.

Polyisocyanate functional adducts can also be used that are formed from any of the forgoing organic polyisocyanate and a polyol. Polyols such as trimethylol alkanes like trimethylol propane or ethane can be used. One useful adduct is the reaction product of tetramethylxylidene diisocyanate and trimethylol propane and is available under the tradename of Cythane® 3160. When the crosslinkable resin of the present invention is used in exterior coatings, the use of an aliphatic or cycloaliphatic isocyanate is preferable to the use of an aromatic isocyanate, from the viewpoint of weatherability and yellowing resistance. An example of a suitable blocked isocyanate that can be used in the present system is a pyrazole blocked polyisocyanate of 1,6-hexamethylene diisocyanate which is available from Bayer Corporation.

The primer coating composition of the present invention further comprises at least one dispersed polymer referred to herein as a SRD (solvent responsive dispersion) polymer. The present invention will now be discussed generally in the context of one specific type of SRD. It will be apparent to those skilled in the art that other types of SRDs can also be used in the present invention.

The SRD polymer that will now be described is a graft copolymer having a backbone (or core) and side chain(s) (so-called "arms") grafted thereto in which one of the portions (either the arms or the backbone) is created substantially to totally insoluble in the solvent mixture employed in the coating composition. The backbone (or core) portion is most desirably selected to be the insoluble phase, while the graft arms of the SRD are most desirable selected to be soluble in the solvent mixture. This results in a dispersed polymer which is lower in viscosity when compared to a solution polymer of equal molecular weight. Another useful SRD is one where the backbone is soluble and the graft arms are non-soluble in the solvent mixture.

In any event, upon spray application, the coating composition loses most of the SRD non-solvent due to evaporation. As a result, the graft copolymer becomes soluble and exhibits a higher viscosity than the dispersion. This increase in viscosity helps to prevent the intermixing of the basecoat with the primer when applied wet on wet. The SRD should therefore be used in a sufficient amount to prevent such intermixing. While a wide variety of SRD resins can be used, as will be evident to those skilled in the art, those found to be particularly satisfactory in the present invention include acrylic and styrenated acrylic SRD polymers.

While not wishing to be bound by any particular mechanism, the inclusion of the forgoing SRD acrylic polymer is believed to act as a thickening agent and thus prevent intermixing of the wet primer and basecoating layers. It is believed that the SRD, when included in a coating composition containing a solvent mixture that is predominately a non-solvent for the SRD is a coiled, tightly packed particle. The primer coating will then have a sufficiently low viscosity so as to enable easy application such as by spraying, without the need to employ appreciable amount of volatile solvents. During the spray application and after being coated on the substrate, the volatile non-solvent evaporates first from the coating, causing the SRD particle to uncoil into the remaining solvent. This uncoiling of the SRD is then believed to cause the polymer to exhibit its high molecular weight and thicken the coating composition and thereby increase the viscosity of the coating enough to prevent intermixing or bleeding of the basecoat therein.

As indicated above, while a wide variety of SRD resins can be used, the present invention will now be discussed generally in the context of acrylic or styreneated acrylic SRD resins, wherein the backbone is the insoluble portion.

In the preparation of such an SRD polymer where the backbone (or core) is the insoluble portion, a macromonomer (which ultimately forms the arms) is first prepared which is soluble in the final solvent composition. The final graft copolymer is then prepared by copolymerizing, preferably by free radical copolymerization, backbone monomer(s) with macromonomer. Preferably at least about 5 wt. % of the monomers used to form the backbone, macromonomer, or both contain functional groups, such as hydroxyl groups, that will react with the film forming components present in the primer coating composition, thus enabling the SRD polymer to become a permanent part of the final film network. This structure enhances film adhesion, improves the overall mechanical properties of the coating film in general, and prevents deterioration or delamination of the film upon aging, as may occur if the SRD polymer remained an unreacted component.

The graft copolymer used in the present invention has a weight average molecular weight of about from 10,000 to 100,000, preferably about from 35,000 to 85,000. The graft copolymer can be prepared by polymerizing ethylenically unsaturated monomers in the presence of macromonomers each having terminal unsaturation for grafting. The resulting polymer can be represented as being composed of a backbone having a plurality of macromonomer "arms" attached thereto.

In a preferred process of preparing the graft copolymers used in the present invention, cobalt chain transfer is used in the first step of a two step process. This first step typically involves polymerizing, in an inert organic solvent, a mixture of ethylenically unsaturated monomers using a catalytic chain transfer agent, preferably containing $Co^{+2}$ or $Co^{+3}$, to obtain macromonomers.

As indicated above, the preferred catalytic chain transfer agent is a compound which contains $Co^{+2}$ or $Co^{+3}$. Exemplary cobalt chelates are those described in U.S. Pat. No. 4,680,352 to Janowicz et al. and U.S. Pat. No. 4,722,984 to Janowicz, hereby incorporated by reference in their entirety. Most preferred chelates are pentacyanocobaltate (II), diaquabis(borondifluorodimethyl glyoximato) cobaltate (II) and diaquabis(borondifluorodiphenylglyoximato) cobaltate (II). $Co^{+3}$ catalysts are described in PCT Patent Application WO87/03605, also hereby incorporated by reference. Such chain transfer agents are ordinarily used at concentrations of 5-250 ppm based on the weight of the monomers.

Typically, a mixture of monomers and organic liquid is heated, preferably to reflux temperature for ease of control, and to the mixture is added the catalytic chain transfer agent of choice. Additional monomers, solvent, and azo initiator are added over time to generate the macromonomer solution. In general, molecular weights (Mw) are about from 5,000 to 40,000 and preferably about from 25,000-40,000. Solvents which can be used are aromatic and aliphatic hydrocarbons, esters, ketones, alcohols and mixtures thereof.

The second step in the preferred process of preparing the graft copolymer involves forming a polymeric backbone by polymerizing, in an organic solvent, in the presence of said previously prepared macromonomers, another mixture of ethylenically unsaturated monomers. This polymerization, whereby the backbone of the graft polymer is formed, may employ any free radical or vinyl addition polymerization reaction process, and does not necessarily require a chain transfer agent. A typical vinyl addition polymerization reaction is usually conducted at a temperature within the range of about 80° C. to about 160° C., preferably 90° C. to 130° C.

During polymerization of the backbone, there is generally present a free radical initiator which is selected from a wide variety of materials. Suitable types of materials include peroxides, hydroperoxides and azo initiators. Examples of these types of initiators include di-tertiarybutyl peroxide, dicumylperoxide; amyl peroxyacetate; cumenehydroperoxide; 2,5-dimethyl-2,5-bis(tertiarybutylperoxy) hexane; hexyne-3-tertiarybutyl cumylperoxide; tertiaryamyl peroxide; 2,5-dihydroperoxy-2,5-dimethyl hexane, di(n-propyl) peroxydicarbonate and 2,2'-azobis(2,4-dimethyl-4-methoxyvaleronitrile). The amount of initiator can vary widely, although usually it is present in an amount ranging from about 1% to about 8%, the percentage based on the total weight of the vinyl monomer component.

Generally, there is also present during the vinyl addition polymerization a solvent which assists in maintaining the preferred reaction temperature. Typical solvents and diluents include toluene, xylene, butyl acetate, acetone, methyl isobutyl ketone, methyl ethyl ketone, ethyl amyl ketone, methanol, isopropanol, butanol, hexane, acetone, ethylene glycol, monoethyl ether, VM and P naptha, mineral spirits, heptane and other aliphatic, cycloaliphatic, aromatic hydrocarbons, aromatic petroleum distillates, esters, ethers and ketones, and the like. The solvent choice will be guided by the composition of the insoluble phase. Typically, the solvent that is chosen for polymerization will be a non-solvent for the backbone. Since the backbone is usually formulated to be substantially to totally non-soluble in non-polar solvents, non-polar solvents are usually selected such as aliphatic and aromatic hydrocarbons.

This graft copolymer can further comprise copolymerized monomers of alkyl methacrylates, or alkyl acrylates or mixtures thereof, where the alkyl groups have 1-18 carton atoms. Optionally, the acrylic polymer can contain other components such as styrene, alpha methyl styrene, acrylonitrile, methacrylonitrile, acrylamide, methacrylamide in amounts of about 0.1-50% by weight. Hydroxyl functional groups can be introduced into the desired segment during its polymerization by the introduction into the monomer mixture of hydroxy alkyl acrylates, or hydroxy alkyl methacrylates or mixtures thereof, where the alkyl groups have 1-8 carton atoms.

Typical alkyl acrylates and methacrylates that can be used to form the branched acrylic polymer are as follows: methyl methacrylate, ethyl methacrylate, propyl methacrylate, butyl methacrylate, pentyl methacrylate, hexyl methacrylate, octyl methacrylate, decyl methacrylate, lauryl methacrylate, methyl acrylate, ethyl acrylate, propyl acrylate, butyl acrylate, octyl acrylate, nonyl acrylate, decyl acrylate, lauryl acrylate and the like. Other components that can be used to form the acrylic polymer are acrylamide and methacrylamide, acrylonitrile and methacrylonitrile. Typical hydroxy alkyl acrylates and methacrylates are as follows: 2-hydroxyethyl methacrylate, 3-hydroxypropyl methacrylate, 4-hydroxylbutyl methacrylate, 2-hydroxyethyl acrylate, 3-hydroxypropyl acrylate, 4-hydroxybutyl acrylate, and the like. A functional amount of SRD polymer is used in the present formulations, and will vary widely, depending on the specific binder and crosslinking resin selected, as well as their molecular weight and relative proportions. While the specific concentration of the SRD polymer will be selected in view of these variables, as evident to those skilled in the art, the quantities will generally be about from 10 to 40 wt % based on the weight of the binder solids in the formulation. Typically, if the amount is less than 10% by weight, general appearance of the coated film may become poor and basecoat flake misalignment may occur, whereas if more than 40% by weight, adhesion and chipping resistance may deteriorate. Preferably, the amount is 20 to 30% by weight.

Optionally, in addition to the above film-forming binder constituents, the composition may also contain other film-forming binder and/or crosslinking resins, such as acrylic resins, acrylourethane resins, alkyd resins, epoxy resins, polyester resins, polyester urethane resins, and the like. However, as indicated above, it is generally desired that the primer composition be essentially to totally free of crosslinked microgel resin particles based on, for example, acrylic microgels, and crosslinked NAD resin particles, based on, for instance, acrylic NADs as part of the film-forming binder.

Besides the film-forming binder constituents, the coating composition of the present invention may also include minor amounts of non-binder solids. Generally, catalysts, pigments, or chemical additives such as stabilizers are not considered part of the binder solids. Non-binder solids other than pigments usually do not amount for more than about 5-15% by weight of the composition. Such additional additives will, of course, depend on the intended use of the coating composition.

For instance, to increase the rate of crosslinking of the composition on curing, a catalyst can be added to the composition. Generally, about 0-3% by weight, based on the weight of the binder, of catalyst is used. Typical of such catalyst are blocked acid catalysts. Typically useful blocked acid catalysts are aromatic sulfonic acids blocked with amino methyl propanol or dimethyl oxazoline. Typically useful aromatic sulfonic acids are para toluene sulfonic acid, dodecyl benzene sulfonic acid, decyl benzene sulfonic acid. One preferred catalyst is dodecyl benzene sulfonic acid blocked with amino methyl propanol.

To improve the outdoor weatherability of the composition and protect the coated substrate from premature degradation, the composition typically contains about 0.01-2% by weight, based on the weight of the binder, of ultraviolet light stabilizers which term includes ultraviolet light absorbers, screeners and quenchers. Typical ultraviolet light stabilizers include benzophenones, triazines, triazols, benzoates, hindered amines and blends of thereof.

Typical pigments that can be used in the composition are filler pigments such as talc, china clay, barytes, carbonates, silicates, and color pigment such as metallic oxides such as titanium dioxide, zinc oxide and iron oxide and carbon black and organic colored pigments and dyes. The resulting primer composition has a pigment to binder weight ratio of about 1:100-150:100.

The pigments can be introduced into the primer composition by first forming a mill base with an acrylic copolymer dispersant or with another compatible polymer or dispersant by conventional techniques such as sand grinding, ball milling or attritor grinding. The mill base is blended with other constituents used in the composition.

In general, a gray color primer prepared by using carbon black and titanium dioxide as main pigments is typically employed. However, various color pigments may be employed to provide various colors for example that having a hue similar to that of the colored basecoat layer that is subsequently applied directly thereover. This is done to enable the colored basecoat to achieve complete hiding at the lowest possible film build. In addition, it is generally desirable to include small amounts of talc in the composition to improve the chipping resistance of the coating film.

As to the liquid carrier, any of the conventional organic solvents or solvent blends can be used to form the primer composition provided that the selection of solvents is such that the polymeric binder constituents are compatible and give a high quality primer coating. Typically, a solvent blend is chosen which includes at least one non-solvent, typically a non-polar solvent, for the backbone material in the SRD. The coating composition preferably contains a blend of polar and non-polar solvents, wherein the non-polar solvent (or non-solvent for the SRD) comprises at least 50% by weight, preferably from about 60 to 90% by weight, based on the weight of total solvent.

The following are examples of solvents that can be used to prepare the composition: polar solvents such as: methyl ethyl ketone, methyl amyl ketone, methyl isobutyl ketone, acetone, ethylene glycol monobutyl ether acetate and other esters, ethers, and ketones; and non-polar solvents such as: toluene, xylene, and aliphatic and aromatic hydrocarbon solvents that are conventionally used. Of course, the ratio of the non-solvent to solvent for the core composition can vary and be adjusted to effect the particle size and viscosity of the dispersion. Typically, increasing the amount of non-solvent results in a larger particle size and lower viscosity solution. A dispersion particle size of up to about 500 nm, and preferably in the range of 200-400 nm, is generally preferred, to maintain sufficiently low spray viscosity and good flow during application.

In addition to the above ingredients, the composition may also include other conventional formulation additives such as toughening agents, and flow control agents, for example, such as Resiflow® S (polybutylacrylate), BYK® 320 and 325 (high molecular weight polyacrylates). Such additional additives will, of course, depend on the desired final properties of the coating composition, as will be apparent to those skilled in the art. In addition, conventional Theologically active agents, such as Garamite® clay, fumed silica, urea sag control agents, and the like can also be used, for enhanced intermixing resistance.

As indicated above, high solids primer compositions are generally preferred for use in the multi-layer coating process of this invention. The primer coating composition preferably has a total solids content (% non-volatile) of about 40 to 70% by weight at the time of application, and preferably between 50 and 65% by weight, based on the total weight of the coating composition. in order to keep air pollution to a minimum level. High solids coatings behave like low solids liquid coatings but have the additional benefit of lower solvent content and significantly reduced emissions. The volatile organic content at such solids typically translates to less than about 3.5 pounds of organic solvent per gallon of curable composition, as determined under the procedure provided in ASTM D3960.

It should be understood however, that additional solvent may be added, if necessary, at the time of application to adjust the spray viscosity and control the flow and leveling of the coating and provide other desirable properties, as will be apparent to those skilled in the art.

The primer composition can be applied to a plastic or metal substrate by conventional techniques such as spraying, electrostatic spraying, dipping, brushing, flowcoating and the like.

Base Coated Layer

In the method for forming the multi-layer coating film according to the present invention, a colored base coating material is employed for forming a base coated layer. The base coated layer forms a top coated film together with a clear coated layer which will be described later. This base coating composition contains a film forming resin, usually a curing agent, a color pigment and optionally an effect pigment, to impart a special visual effect such as sparkle, pearlescent, luminescent, and/or metallic appearance or an increased depth of color to the cured coating composition.

Any of the conventionally known basecoat compositions can be used in the method of the invention. In general, the composition of the basecoat is not limited by the present invention. The base coating composition may be a solvent type or a water-borne type.

Examples of film forming resins contained in the base coating material include, but are not limited to, polyester resins, acrylic resins, alkyd resins, epoxy resins, urethane resins and the like, and resins may be employed alone or in combination. The film forming resin can be employed in combination with a curing agent. Examples of the typical curing agents include amino resins such as melamine formaldehyde condensates and/or blocked isocyanate resins.

An example of a typical high solids solvent borne basecoat, in addition to color pigments, optional aluminum flakes, and UV absorber, comprises by weight of composition, about 10% microgel for rheology control, 21% melamine formaldehyde resin, 15% branched polyester resin, 5% hydroxy functional acrylic resin, 1% dodecyl benzyl sulfonic acid catalyst, and 40% solvent to disperse and/or dilute the above mentioned polymers and facilitate spray application.

Clear Coated Layer

For forming the clear coated layer, a clear coating composition is employed. The clear coating composition is not particularly restricted and may be a clear coating material which contains a film forming resin, a curing agent and the like. The clear coating material may be a solvent type, a water-borne type or a powder type.

High solids solvent borne clear coats which have low VOC (volatile organic content) and meet current pollution regulations are generally preferred. Typically useful solvent borne clearcoats include but are not limited to 2K (two component) systems of polyol polymers crosslinked with isocyanate and 1K systems of acrylic polyol crosslinked with melamine or 1K acrylosilane systems in combination with polyol and melamine.

Suitable 1K solvent borne acrylosilane clearcoat systems that can be used in the process of the present invention are disclosed in U.S. Pat. No. 5,162,426, hereby incorporated by reference. Suitable 1K solvent borne acrylic/melamine clearcoat systems are disclosed in U.S. Pat. No. 4,591,533, hereby incorporated by reference.

Epoxy acid systems can also be used. Such finishes provide automobiles and trucks with a mirror-like exterior finish having an attractive aesthetic appearance, including high gloss and DOI (distinctness of image).

Substrate

The method for forming a coated film of the present invention may be applied to various substrates such as metals, plastics and foamed bodies, and combinations thereof, preferably to metal surfaces and moldings, and more preferably to metal products on which cationic electrodeposition coated film has been formed.

Examples of the metal substrates include iron, copper, aluminum, tin, zinc and the like and alloys containing these metals, such as steel. Specific products include bodies and parts of automobiles such as passenger cars, trucks, motorcycles and buses.

The metal substrates that are particularly preferred are those preliminarily subjected to forming treatment with phosphate salt, chromate salt or the like.

The substrate may have an electrodeposition coated film on the surface subjected to forming treatment. The electrodeposition coated film may be formed from an anionic or a cationic electrodeposition coating material. However, a cationic electrodeposition coating material is preferred since it provides excellent corrosion resistance.

Examples of plastic substrates that can be coated according to the method of the present invention include polyester reinforced fiberglass, reaction-injection molded urethanes, partially crystalline polyamides, and the like or mixtures thereof, which may be primed or unprimed or otherwise treated as well prior to treating by the coating method described herein. These plastic substrates are oftentimes used in fabricating specific automotive body parts, such as fenders, bumpers, and/or trim parts.

Method for Forming Coated Film

According to the method for forming a multi-layer coated film of the present invention, as exemplified in FIG. 1, a primer coated layer 12 is formed on a substrate (automobile body 10 shown in FIG. 1) using the primer coating composition, then a base coated layer 14 is formed using the base coating material and a clear coated layer 16 is formed using the clear coating material in this order in the wet-on-wet manner.

According to the present invention, when the three coating compositions described above are applied to automobile bodies, conventional coating methods such as spraying, electrostatic spraying, high speed rotational electrostatic bells, and the like, can be conducted. The preferred techniques for applying all three coatings are air atomized spraying with or without electrostatic enhancement, and high speed rotary atomizing electrostatic bells, since these techniques are typically employed in modern automobile and truck assembly plants.

When the primer coating material is applied to automotive bodies according to the present invention, any of the above techniques can be used.

The primer coating material forms a dry coated layer having a thickness of usually 0.3 to 2.5 mils (7 to 60 μm), preferably 0.5 to 1.5 mils (12 to 36 μm), but it may vary according to the intended use. If the thickness is more than the upper limit, image sharpness may deteriorate or a trouble such as unevenness or sagging may occur at the time of application. If it is less than the lower limit, the electro-primed substrate cannot be hidden, and film discontinuity may occur, which could expose the lower electrocoat layer to excess UV transmission and degradation.

On the uncured primer coated layer, a base coating material and a clear coating material are applied in the wet-on-wet manner to form a base coated layer and a clear coated layer.

The base coating material may be applied, like the primer coating material, using air-electrostatic spray coating or a rotary atomizing electrostatic bell so as to have a dry thickness of 0.4 to 1.2 mils (10 to 30 μm).

The clear coated material is then applied on the base coated layer, for the purpose of smoothing roughness or glittering which occurs due to the presence of luster color pigment and for protecting a surface of the base coated layer. The clear coated material may be applied, like the base coating material, using the rotary atomizing electrostatic bells.

The clear coated layer is preferably formed so as to have a dry thickness of about 1.0 to 3.0 mils, (25-75 μm).

Figure 2:
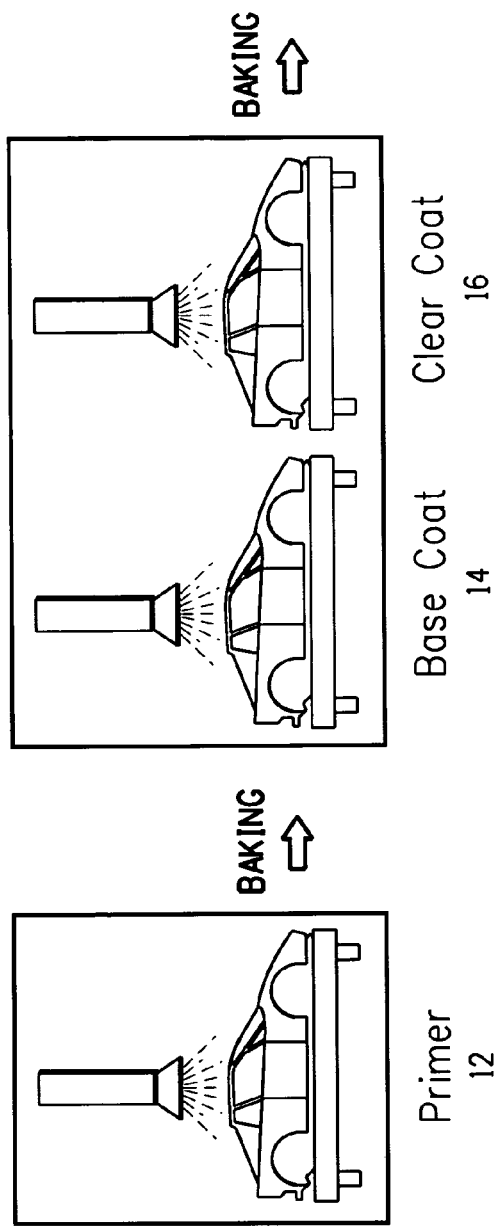
FIG. 2 is a schematic diagram of a conventional automotive coating process that requires a separate primer spray booth and primer baking process.

The multi-layered coated layers obtained as described above are then cured (i.e., baked) simultaneously, as shown in FIG. 1, to form a layered coated film. This is what we call "three-coat-one-bake method." This method requires no oven for drying the primer coated layer before being base coated (which is required in the conventional process shown in FIG. 2), and is favorable from the economical and the environmental viewpoint.

The three layered coated film is then cured in a curing oven at a curing temperature within the range of 100 to 180° C., preferably 130 to 160° C., so as to obtain a cured coated film with high crosslinking density. The curing time may vary depending on the curing temperature, however, a curing time of 10 to 30 minutes is adequate when the curing temperature is 130° C. to 160° C.

According to the process of the present invention, the multi-layered coated film is formed so as to have a thickness of 3 to 5 mils (75 to 120 μm). It is important to have an adequate film build in each of the layers of the present invention, as a low film build will affect the appearance, mechanical properties, and the amount of UV transmittance to the underlying layers. Too low a film build can allow UV radiation to penetrate to the electrocoated layer. Most electrocoat layers are not formulated with UV absorbers and they tend to be very susceptible to UV degradation.

The following examples further illustrate the present invention, however, these are not to be construed as limiting the present invention to their details. All parts and percentages are on a weight basis unless otherwise indicated. All molecular weights disclosed herein are determined by GPC (gel permeation chromatography) using polystyrene as the standard. Unless otherwise specified, all chemicals and reagents can be obtained from Aldrich Chemical Company, Milwaukee, Wis.

EXAMPLES

The following SRD dispersions were prepared and then used to form the following three wet primer coating compositions of this invention.

Example 1

Preparation of Macromonomer for SRD

BMA/EHMA/IBOMA/HEMA, 45/30/15/10% by Weight

To a 5-liter flask fitted with an agitator, condenser, heating mantle, nitrogen inlet, thermocouple and an addition port was added 99.0 gms. butyl methacrylate, 66.0 gms 2-ethylhexyl methacrylate, 33.0 gms isobornyl methacrylate, 22.0 gms hydroxyethyl methacrylate, 317 gms butyl acetate and 477.9 gms ethyl acetate. The mixture was agitated and heated to reflux under nitrogen. To this was then added, in one portion, a pre-mix of a solution of 2.2 gms. Vazo® 52, 129.0 gms ethyl acetate and 17.2 gms. and 0.07 gms of bis(Boron Difluoro Diphenyl Glyoximate) Cobaltate (II). This was followed by the addition of a pre-mix of a solution of 891.0 gms. butyl methacrylate, 594.1 gms 2-ethylhexyl methacrylate, 297.0 gms isobornyl methacrylate, 198.0 gms hydroxyethyl methacrylate and 44.8 gms ethyl acetate over 180 minutes while maintaining reflux. A solution of 19.8 gms Vazo 52 and 435.7 gms ethyl acetate was added simultaneously over a 330 minute period. Following a 30 minute hold period, a premixed solution of 1.1 gms. tertiary butyl peroctoate and 52 gms. ethyl acetate was added over 15 minutes while maintaining reflux. The batch was then held at reflux for an additional 30 minutes. At the end of the hold period 70.3 gms of ethyl acetate was added. The reaction mixture was then cooled.

The macromonomer so prepared had a number average molecular weight of 17027 and a weight average molecular weight of 36450 as determined by GPC. Weight solids were 58.6% and Gardner Holdt viscosity (ASTM D1545-98) measured at 25° C. was X+¼.

Example 2

Preparation of Solvent Responsive Dispersion (SRD) Polymer

[64]MMA/MA/AN/Sty
60/32/5/13//[36]BMA/EHMA/IBOMA/HEMA
45/30/15/10% by Weight

To a 5-liter flask fitted with an agitator, condenser, heating mantle, nitrogen inlet, thermocouple and an addition port was added 839.9 gms. of macromonomer from Example 1, 166.9 gms mineral spirits, 442.6 gms heptane, 14.6 gms ethyl acetate and 18.2 gms styrene and the temperature raised to reflux under nitrogen. To this was added a premixed solution of 532.6 gms. methyl methacrylate, 284.4 gms. methyl acrylate, 26.9 gms. styrene, 44.4 gms acrylonitrile, 13.4 gms. tertiary butyl peroctoate, 23.7 gms. ethyl acetate and 72.9 gms mineral spirits over 210 minutes holding the temperature at reflux. Following a 120 minute hold period, 180 gms of solvent were removed via distillation. The reaction mixture was then cooled to room temperature.

Molecular weight via gel permeation chromatography was found to be 83000 weight average. Weight solids were 62.2%.

Example 3

Preparation of Solvent Responsive Dispersion (SRD) Polymer

[55]MMA/MA/AN/Sty
60/32/5/3//[45]BMA/EHMA/IBOMA/HEMA
45/30/15/10% by Weight

To a 5-liter flask fitted with an agitator, condenser, heating mantle, nitrogen inlet, thermocouple and an addition port was added 1044.2 gms. of macromonomer from Example 1, 166.9 gms mineral spirits, 442.6 gms heptane, 14.6 gms ethyl acetate and 15.7 gms styrene and the temperature raised to reflux under nitrogen. To this was added a premixed solution of 459.1 gms. methyl methacrylate, 245.1 gms. methyl acrylate, 23.2 gms. styrene, 38.3 gms acrylonitrile, 20.0 gms. tertiary butyl peroctoate, 23.7 gms. ethyl acetate and 72.9 gms mineral spirits over 210 minutes holding the temperature at reflux. Following a 120 minute hold period, 180 gms of solvent were removed via distillation. The reaction mixture was then cooled to room temperature. Molecular weight via gel permeation chromatography was found to be 61724 weight average. Weight solids were 59.5%.

Example 4

Preparation of 3 Wet Primer Containing SRD Above

A gray colored primer surface composition was prepared by mixing together the following ingredients in a suitable mixing vessel in order shown:

| Components | Parts by Weight |
| --- | --- |
| Polyester resin[1] | 21.52 |
| Butyl Acetate[2] | 8.72 |
| Flow additive[3] | 0.11 |
| White pigment dispersion[4] | 31.42 |
| Carbon black pigment dispersion[5] | 0.50 |
| Melamine formaldehyde resin[6] | 10.20 |
| SRD- PL5391[7] | 9.00 |
| SRD- PL5479[8] | 9.00 |
| Talc pigment dispersion[9] | 8.27 |
| Acid catalyst solution[10] | 1.26 |
| Total | 100.00 |

Table Footnotes
[1]Branched Polyester polyol resin with a hydroxyl number of 130, 75% Solids in methyl isobutyl ketone solvent. The polyester resin had an acid number of 13.5 consisted of neopentyl glycol/trimethylolpropane/adipic acid/isophthalic acid/phthalic anhydride 39.1/9.4/12.2/13.8/25.5% by weight.
[2]Butyl acetate solvent
[3]50.0% weight of acrylic copolymer of isobutyl acrylate and isobutyl methacrylate 50:50% by weight in butyl acetate.
[4]68% Solids of titanium dioxide pigment dispersed in acrylic resin in ester solvent
[5]Carbon Black Pigment Dispersion with 18.10% total solids and 16.20 weight % pigment carbon black Raven 500 Ultra II ® from Columbian Chemicals Company.
[6]Resimene ® CE 4514, monomeric melamine formaldehyde resin supplied by Surface Specialties Inc.
[7]SRD- PL5391 from Example 2 above.
[8]SRD- PL-5479 from Example 3 above.
[9]9% Solids of talc pigment dispersion in acrylic resin solution and aromatic hydrocarbon solvent.
[10]48% of Nacure ® XP-221, aromatic sulphonic acid, supplied by King Industries, Norwalk, Connecticut.

The resulting 3 wet primer surfacer composition had a theoretical solid content of 69.5% and spray solids was 52% by weight.

Example 5 and Comparative Example

3 Wet Coating Method Using 3 Wet Primer Prepared Above Compared to Conventional Baked Primer Phosphated steel panels were coated in two different ways: (1) using 3 Wet coating method with primer prepared above (example 3); and (2) using a conventional primer baking process with the standard baking primer (comparative example) as a control.

In Example 5, the primer surfacer of Example 4 was applied by spraying primer-surfacer onto a phosphatized steel panel coated with a cured cathodic epoxy resin based eletrodeposition primer (Cormax® 6 ED from DuPont Company, Wilmington, Del.) to get a film build of 23 microns. The primer surfacer layers and all following layers were applied using a 55 serrated bell cup. After primer surfacer application, the panels were allowed to air flash dry at room temperature for 3 minutes and this was followed by the application of Silver Birch solvent borne basecoat (commercial code 647A01111 from Du Pont Company) in two coats to get a film build of 18 microns with flash off 3 minutes and followed by the application of acrylosilane clearcoat (Gen® 4 ES DuPont Company, Wilmington, Del.) to get a film build of 40 microns and flashed dried for 10 minutes and baked for 30 minutes 140° C. on vertical and horizontal position for this study.

The 3 wet primer surfacer composition above was applied in comparison with commercial Titanium Frost 2 in 1 baking primer 708-DN079 from DuPont Company in Comparative Example 1 using a conventional process baking the primer between basecoat application for Comparative Example 1.

The test results are summarized in the Table below.

In the Table, flop, adhesion, chip, and overall appearance were tested according to the following procedures.

Flop—The flop values—which measure the quality of the metallic effect of the finish—were calculated from measurements determined by the X-Rite® machine from X-Rite Inc., which measures the brightness property of each panel from 15°, 45°, and 110° angles. An average of three readings is taken at each angle and the following formula is used to calculate the flop:

Flop=$((L15°-L110°)*10L45°)$.

Adhesion—the adhesion of 0 to 5 was determined in accordance with test method ASTM D3359—a rating of at least 4B is an acceptable minimum.

Chip Resistance—which measures the ability of a coating system to resist physical damage from impact of a hard material most commonly stones or gravel which are thrown against the vehicle by the wheels of passing cars, or in the case of rocker panels thrown up against the car by the wheels of the same car—was determined utilizing a gravelometer and follows the procedure described in test method SAE J-400—a rating of at least 5 is an acceptable minimum.

Appearance—the appearance was determined using a wavescan DOI instrument available from Byk Gardner. The determination of whether the appearance was of automotive quality, i.e., whether the coating had an aesthetic appearance that meets the standard of automotive finishes, was determined by measurements taken from the above wavescan DOI instrument. This instrument measures the visual appearance of a finish by looking at longer waves that are indicative of a condition commonly known as orange peel and looking as well at shorter waves which helps to quantify the so-called "distinctness of image" or DOI. These parameters taken in combination (by WaveScan CF readings) can be used to quantify the overall visual appearance of a vehicle finish. A minimum of horizontal 60 and vertical 50 is desirable for automotive use.

TABLE 1

Physical Properties of Panels Using DuPont 708 Line Primer Conventional Process × 3 Wet Primer and 3 Wet Process

| | Primer | Process | Adhesion | Chip (SAE J400) | Flop | Appearance (CF) |
|---|---|---|---|---|---|---|
| Comparative Example | 708DN079 | Conventional | 5 (No failure) | 5A | 14.84 | 55.6 |

TABLE 1-continued

Physical Properties of Panels Using DuPont 708 Line Primer Conventional Process × 3 Wet Primer and 3 Wet Process

| | Primer | Process | Adhesion | Chip (SAE J400) | Flop | Appearance (CF) |
|---|---|---|---|---|---|---|
| Example 3 | 3 Wet SRD Primer of Example 2 | 3 Wet | 5 (No failure) | 5A | 13.45 | 34.0 |

In summary, the results indicated that an automotive quality appearance can be obtained using the primer coating composition of this invention in a three-coat-one-bake (i.e., 3 wet) process, having properties the same or similar to conventional baked primers applied by a conventional baking process.

Various other modifications, alterations, additions or substitutions of the components of the processes and compositions of this invention will be apparent to those skilled in the art without departing from the spirit and scope of this invention. This invention is not limited by the illustrative embodiments set forth herein, but rather is defined by the following claims.

What is claimed is:

1. A method for forming a multi-layer coating film comprising sequentially applying an primer coating composition, a base coating composition and a clear coating composition on a substrate; and simultaneously curing the applied three layers by baking, wherein the primer coating composition comprises: a film forming binder and an organic liquid carrier, and optionally pigment(s) in a pigment to binder weight ratio of about 1:100-150:11; and the binder contains about:
   (a) about 30 to 80% by weight, based on the weight of the binder, of a hydroxyl functional polyester resin;
   (b) about 10 to 30% by weight, based on the weight of the binder, of a crosslinking agent selected from the group consisting of a melamine resin, a blocked polyisocyanate resin, or a mixture thereof;
   (c) about 10 to 40% by weight, based on the weight of the binder, of a graft polymer comprising a non-crosslinked core of acrylic polymer which is substantially non-soluble in non-polar organic solvent and, grafted to the core, a plurality of substantially linear acrylic stabilizer components, each of which is soluble in the non-polar organic solvent and has one end of the stabilizer molecule grafted to the core and a weight average molecular weight of about 10,000 to 100,000.

2. The method of claim 1 wherein the composition comprises at least one non-polar organic solvent at the time of application.

3. The method according to claim 1, wherein the primer composition is totally free or essentially free of particles of nonaqueous dispersion resins and/or crosslinked microgel resins.

4. The method according to claim 1, wherein the method is performed on a pre-primed substrate on which an electrodeposition coated film has been formed.

5. The method according to claim 1 wherein the substrate is a vehicle body or part thereof.

\* \* \* \* \*